US010417335B2

United States Patent
Jaroch (10) Patent No.: US 10,417,335 B2
(45) Date of Patent: Sep. 17, 2019

(54) AUTOMATED QUANTITATIVE ASSESSMENT OF TEXT COMPLEXITY

(71) Applicant: Colossio, Inc., Chicago, IL (US)

(72) Inventor: Joseph A. Jaroch, Chicago, IL (US)

(73) Assignee: Colossio, Inc., Chicago, IL (US)

( * ) Notice: Subject to any disclaimer, the term of this patent is extended or adjusted under 35 U.S.C. 154(b) by 0 days.

(21) Appl. No.: 15/729,098

(22) Filed: Oct. 10, 2017

(65) Prior Publication Data

US 2019/0108215 A1    Apr. 11, 2019

(51) Int. Cl.
| | | |
|---|---|---|
| G06F 17/27 | (2006.01) | |
| G06F 17/24 | (2006.01) | |
| G06F 17/21 | (2006.01) | |
| G06F 16/93 | (2019.01) | |
| G06F 16/35 | (2019.01) | |
| G06F 16/33 | (2019.01) | |
| G09B 17/00 | (2006.01) | |

(52) U.S. Cl.
CPC ........ *G06F 17/277* (2013.01); *G06F 16/3344* (2019.01); *G06F 16/353* (2019.01); *G06F 16/93* (2019.01); *G06F 17/218* (2013.01); *G06F 17/24* (2013.01); *G06F 17/274* (2013.01); *G06F 17/2705* (2013.01); *G06F 17/275* (2013.01); *G09B 17/003* (2013.01)

(58) Field of Classification Search
CPC .................................................. G06F 17/277
USPC ............................................. 704/9; 434/157
See application file for complete search history.

(56) References Cited

U.S. PATENT DOCUMENTS

| | | | | |
|---|---|---|---|---|
| 5,802,539 A | * | 9/1998 | Daniels | G06F 17/21 704/7 |
| 5,828,991 A | * | 10/1998 | Skiena | G06F 17/274 704/9 |
| 5,841,852 A | * | 11/1998 | He | H04M 3/51 379/207.15 |
| 6,138,086 A | * | 10/2000 | Rose | G06F 17/2205 704/8 |
| 8,244,689 B2 | * | 8/2012 | Betz | G06F 16/2458 707/692 |
| 8,990,224 B1 | * | 3/2015 | Ouellette | G06F 7/00 707/748 |
| 2006/0286514 A1 | * | 12/2006 | Gross | G06F 17/2217 434/156 |

(Continued)

*Primary Examiner* — Shaun Roberts
(74) *Attorney, Agent, or Firm* — Barnes & Thornburg LLP (57) ABSTRACT

Various aspects of the subject technology relate to systems, methods, and machine-readable media for automated quantitative assessment of text complexity. A system may include processing at least one body of text in a text-based query using a natural language processing engine. The processed text may include sub-blocks of text in a predetermined sequence size such as an n-gram. The system may compare reference bases to the processed text, where each reference base is associated with a different natural language. The system determines which of the reference bases has a highest number of matching words within the body of text, and thereby identifies the reference base as the source language of the supplied text. The system then determines an average complexity score for n-gram using a quantitative assessment engine. The system then applies a readability score to the body of text based on the average complexity scores of the n-grams.

19 Claims, 6 Drawing Sheets

(56) References Cited

U.S. PATENT DOCUMENTS

| | | | | |
|---|---|---|---|---|
| 2007/0067294 | A1* | 3/2007 | Ward | G06F 17/30867 |
| 2008/0070205 | A1* | 3/2008 | Amick | G06Q 10/00 |
| | | | | 434/178 |
| 2009/0170536 | A1* | 7/2009 | Rang | G06F 3/0237 |
| | | | | 455/466 |
| 2009/0197225 | A1* | 8/2009 | Sheehan | G09B 17/00 |
| | | | | 434/169 |
| 2010/0287162 | A1* | 11/2010 | Shirwadkar | G06F 17/2785 |
| | | | | 707/740 |
| 2012/0239379 | A1* | 9/2012 | Gershnik | G06F 17/275 |
| | | | | 704/8 |
| 2014/0141392 | A1* | 5/2014 | Yoon | G09B 5/04 |
| | | | | 434/156 |
| 2014/0295384 | A1* | 10/2014 | Nielson | A61B 5/162 |
| | | | | 434/157 |
| 2015/0120379 | A1* | 4/2015 | Lee | G06Q 30/02 |
| | | | | 705/7.29 |
| 2015/0248398 | A1* | 9/2015 | Weiss | G09B 5/02 |
| | | | | 434/362 |
| 2017/0193091 | A1* | 7/2017 | Byron | G06F 17/30684 |
| 2017/0277668 | A1* | 9/2017 | Luo | G06F 17/30719 |
| 2018/0189264 | A1* | 7/2018 | Dandala | G06F 17/2276 |

* cited by examiner

AUTOMATED QUANTITATIVE ASSESSMENT OF TEXT COMPLEXITY

BACKGROUND

Field

The present disclosure generally relates to computer-based natural language processing, and more particularly to automated quantitative assessment of text complexity.

Description of the Related Art

Numerous algorithms exist for measuring the complexity of a body of text. These are often used to identify the "grade level" of a book: the age at which the book can be understood by students in school. Some of these algorithms (e.g., FLESCH-KINDCAID, ARI, SMOG) were designed and implemented before the modern computer era on manual typewriters and therefore had a need to be simplistic in their approach, just measuring the complexity based on the number of syllables in words or numbers of letters in words.

SUMMARY

The subject technology includes processing at least one body of text in a text-based query using a natural language processing engine. The processed text may include sub-blocks of text in a predetermined sequence size such as an n-gram. The system may compare reference bases to the processed text, where each reference base is associated with a different natural language. The system determines which of the reference bases has a highest number of matching words within the body of text, and thereby identifies the reference base as the source language of the supplied text. The system then determines an average complexity score for n-gram using a quantitative assessment engine. The system then applies a readability score to the body of text based on the average complexity scores of the n-grams, and provides the readability score to an application of a client device.

According to one embodiment of the present disclosure, a computer-implemented method is provided for automated quantitative assessment of text complexity. The method includes processing at least one body of text in a text-based query using a natural language processing engine, in which the processed at least one body of text includes one or more sub-blocks of text in one or more predetermined sequence sizes. The method also includes comparing a plurality of reference bases to the processed text-based query, in which each of the plurality of reference bases is associated with a different one of a plurality of natural languages. The method also includes determining which of the plurality of reference bases has a highest number of matching words within the body of text of the text-based query. The method also includes associating the text-based query to a natural language associated with the determined reference base from the plurality of natural languages. The method also includes determining an average complexity score for each of the one or more sub-blocks of text using a quantitative assessment engine. The method also includes applying a readability score to the at least one body of text based on the average complexity scores of the one or more sub-blocks of text. The method also includes providing the readability score to an application of a client device, in which the readability score includes a set of floating point scores indicating a level of complexity for the at least one body of text.

According to one embodiment of the present disclosure, a system is provided including one or more processors and a computer-readable storage medium coupled to the one or more processors, the computer-readable storage medium including instructions that, when executed by the one or more processors, cause the one or more processors to process a baseline data structure and a given source language identifier. The instructions also cause the one or more processors to apply one or more standard word delimiters to a body of text to tokenize the body of text into one or more discrete portions of text with predetermined sequence sizes. The instructions also cause the one or more processors to process at least one of the one or more discrete portions of text. The instructions also cause the one or more processors to tag a bitmask associated with the at least one of the one or more discrete portions of text with a source language identifier. The instructions also cause the one or more processors to, for each of the one or more discrete portions of text, modify a count of occurrences for the discrete portion of text using the processed baseline data structure. The instructions also cause the one or more processors to determine whether additional discrete portions of text exist in the body of text. The instructions also cause the one or more processors to sort each of the discrete portions of text by occurrences in the baseline data structure using the modified count of occurrences when the additional discrete portions of text were determined not to exist in the body of text. The instructions also cause the one or more processors to process at least one of the additional discrete portions of text when the additional discrete portions of text were determined to exist in the body of text. The instructions also cause the one or more processors to remove at least one of the sorted discrete portions of text having a count of occurrences that does not exceed a predetermined threshold, the at least one of the sorted discrete portions of text being removed from the baseline data structure.

According to one embodiment of the present disclosure, a non-transitory computer readable storage medium is provided including instructions that, when executed by one or more processors, cause the one or more processors to process a body of text in question via an application on a client device. The instructions also cause the one or more processors to apply standard word delimiters to tokenize the body of text in question into a discrete portion of text with respective sequence sizes. The instructions also cause the one or more processors to process one of the discrete portions of text. The instructions also cause the one or more processors to update a readability score for the discrete portion of text. The instructions also cause the one or more processors to determine an entropy value for the discrete portion of text. The instructions also cause the one or more processors to modify the determined entropy value with a value indicating a number of syllables in the discrete portion of text. The instructions also cause the one or more processors to determine an average complexity score for the discrete portion of text using the modified entropy value. The instructions also cause the one or more processors to determine an average occurrence score for the discrete portion of text based on a number of occurrences of the discrete portion of text in a reference base. The instructions also cause the one or more processors to determine a complexity score for the body of text based on a sum of the average complexity score and the average occurrence score of each of the discrete portions of text. The instructions also cause the one or more processors to provide the complexity score to the application on the client device.

According to one embodiment of the present disclosure, a system is provided for automated quantitative assessment of text complexity, where the system includes a means for storing instructions, and a means for executing the stored instructions to perform a method. The method includes processing at least one body of text in a text-based query using a natural language processing engine, in which the processed at least one body of text includes one or more sub-blocks of text in one or more predetermined sequence sizes. The method also includes comparing a plurality of reference bases to the processed text-based query, in which each of the plurality of reference bases is associated with a different one of a plurality of natural languages. The method also includes determining which of the plurality of reference bases has a highest number of matching words within the body of text of the text-based query. The method also includes associating the text-based query to a natural language associated with the determined reference base from the plurality of natural languages. The method also includes determining an average complexity score for each of the one or more sub-blocks of text using a quantitative assessment engine. The method also includes applying a readability score to the at least one body of text based on the average complexity scores of the one or more sub-blocks of text. The method also includes providing the readability score to an application of a client device, in which the readability score includes a set of floating point scores indicating a level of complexity for the at least one body of text.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the images and detailed description are to be regarded as illustrative in nature and not as restrictive.

BRIEF DESCRIPTION OF THE IMAGES

The accompanying images, which are included to provide further understanding and are incorporated in and constitute a part of this specification, illustrate disclosed embodiments and together with the description serve to explain the principles of the disclosed embodiments. In the images.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

With the advent of greater available processing power in modern computers, a new approach is needed to assess text complexity. Existing complexity measurement algorithms do not convey adequate subtlety in their assessment. For example, a short string of words can produce wildly different results depending on a few extra syllables. Additionally, comparisons across languages are not statistically significant and can introduce wildly inaccurate results from conventional algorithms in languages with a higher ratio of syllables per word. The existing approaches look only at superficial details of each word (word length and number of syllables, in particular). However, the subject system takes into account the complexity of the word and the scarcity of its use in broader language.

The disclosed system addresses the technical problem of measuring the complexity of a body of text with a higher degree of granularity, which specifically arises in the realm of computer technology, by providing a solution also rooted in computer technology, namely, by the configuration of a computer-operated natural language processing network, to provide real-time results at scale, while giving deeper insights into the complexity of a particular body of text. In doing so, the text complexity assessment also identifies the language in which the text was written and also calculates the FLESCH-KINCAID, ARI, and SMOG readability scores to reduce overhead and recalculation efforts.

A primary use case is in the preparation and analysis of digital marketing material. By identifying the score of effective versus ineffective marketing material, refinements can be made to ensure particular users are being targeted with the appropriate level of content. This helps companies tune their messaging on a per-user basis by assessing how users post and matching the messaging to a comparable level of complexity to the content produced by users.

Additionally, this approach can be used by academic journals to identify jargon-heavy papers. Recent findings have shown that some academic papers contain excessive jargon as a means of obfuscating the underlying contents to prevent deeper scrutiny. This generalized scoring can be calculated on each submitted document and compared to previously submitted documents to identify outliers and aid in the overall readability of submitted content.

A further use case pertains to plugins into word processors and email clients, giving authors real-time feedback on the overall complexity of their text, aiding to reduce overly complicated speech or to ensure that corporate memos and printed documentation are adequately readable.

The disclosed system includes one or more processors and a memory storing instructions, which when executed by the one or more processors, cause the subject system to: process at least one body of text in a text-based query using a natural language processing engine, in which the processed at least one body of text includes one or more sub-blocks of text in one or more predetermined sequence sizes. The instructions also cause the subject system to compare a plurality of reference bases to the processed text-based query, in which each of the plurality of reference bases is associated with a different one of a plurality of natural languages. The instructions also cause the subject system to determine which of the plurality of reference bases has a highest number of matching words within the body of text of the text-based query.

The instructions also cause the subject system to associate the text-based query to a natural language associated with the determined reference base from the plurality of natural languages. The instructions also cause the subject system to determine an average complexity score for each of the one or more sub-blocks of text using a quantitative assessment engine. The instructions also cause the subject system to apply a readability score to the at least one body of text based on the average complexity scores of the one or more sub-blocks of text. The instructions also cause the subject system to provide the readability score to an application of a client device, in which the readability score includes a set of floating point scores indicating a level of complexity for the at least one body of text.

The proposed solution further provides improvements to the functioning of the computer itself because it saves data storage space and reduces latency in the system. Specifically, the computer hosting a quantitative assessment engine is not required to maintain an exponential number of documents in data storage nor required to iterate through the exponential number of documents to identify the readability scores because the natural language processing network is configured to iterate through a subspace of representative terms that includes a reduced number of terms that best match the text in question for a matching natural language, thereby reducing the overall system's latency in yielding the text complexity of the text in question.

The present disclosure also provides additional advantages over traditional approaches in assessing text complexity. For example, the subject technology provides for a "one pass" assessment, where, in a single pass, a given text results in the calculation of traditional readability scores (e.g., F-K, ARI, SMOG) and the new readability score generated by the subject technology, as well as identification of the source language of the text. This allows for a significantly reduced time relative to processing each approach independently.

Figure 1:
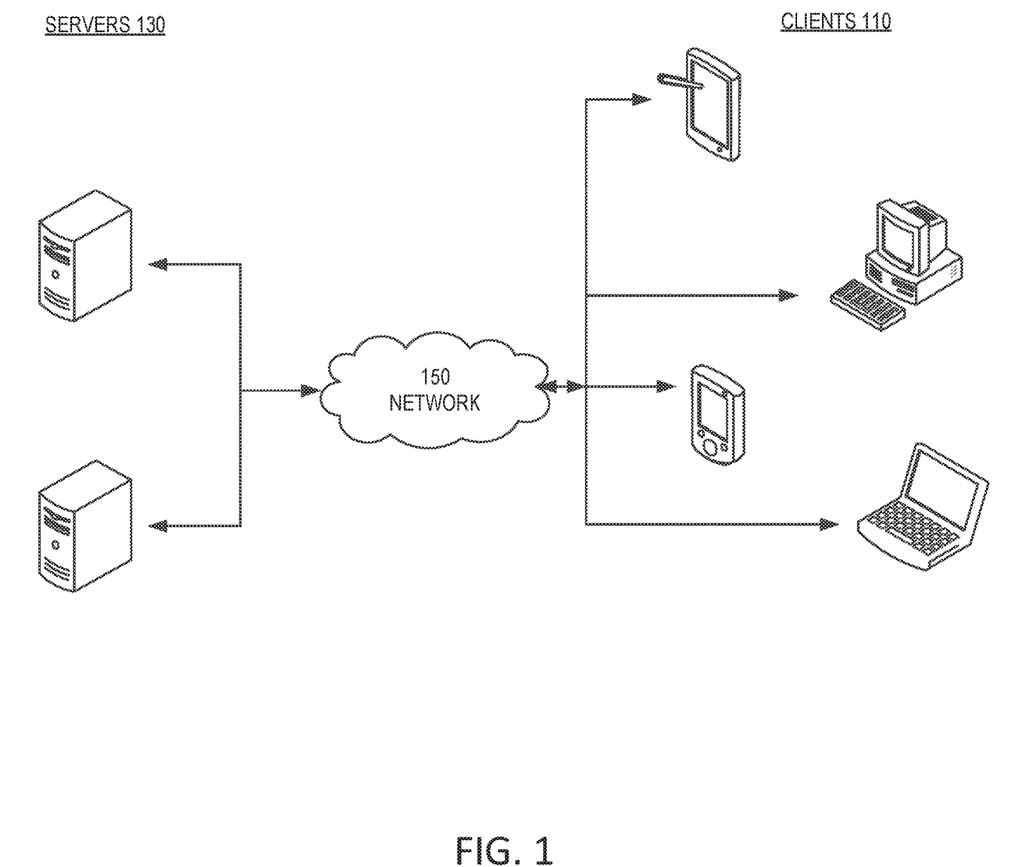
FIG. 1 illustrates an example architecture for the automated quantitative assessment of text complexity suitable for practicing some implementations of the disclosure.

FIG. 1 illustrates an example architecture 100 for the automated quantitative assessment of text complexity suitable for practicing some implementations of the disclosure. The example architecture 100 includes servers 130 and clients 110 connected over a network 150. One of the many servers 130 is configured to host a computer-operated natural language processing network. In some aspects, the clients 110 host the computer-operated natural language processing network to perform the automated quantitative assessment of text complexity locally. The natural language processing network is configured to compute a readability score for each text in question by iterating through words in the text and breaking up the words individually for evaluation using one or more quantitative assessment algorithms. One of the many servers 130 also hosts a collection of content items such as different types of documents containing bodies of text (e.g., digital marketing material, technical papers, academic journals, word processing documents, etc.). The collection of content items can be searched using a content search engine (e.g., accessible through a web page on one of the clients 110, or through a word processing application on one of the clients 110). The servers 130 can return content items to the clients 110 in response to a query for a quantitative assessment of text complexity of at least one of the content items. For purposes of load balancing, multiple servers 130 can host the natural language processing network and multiple servers 130 can host the collection of content items. In some embodiments, the content items include bodies of text, documents, metadata, or the like. In one or more implementations, the collection of content items may refer to a corpus of documents.

The servers 130 can be any device having an appropriate processor, memory, and communications capability for hosting the natural language processing network, the collection of content items, and a quantitative assessment engine. The quantitative assessment engine is accessible by various clients 110 over the network 150. In some aspects, the clients 110 host the quantitative assessment engine locally. The clients 110 can be, for example, desktop computers, mobile computers, tablet computers (e.g., including e-book readers), mobile devices (e.g., a smartphone or PDA), or any other devices having appropriate processor, memory, and communications capabilities for quantitatively assessing the text complexity of content stored on one of the servers 130. The network 150 can include, for example, any one or more of a local area network (LAN), a wide area network (WAN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
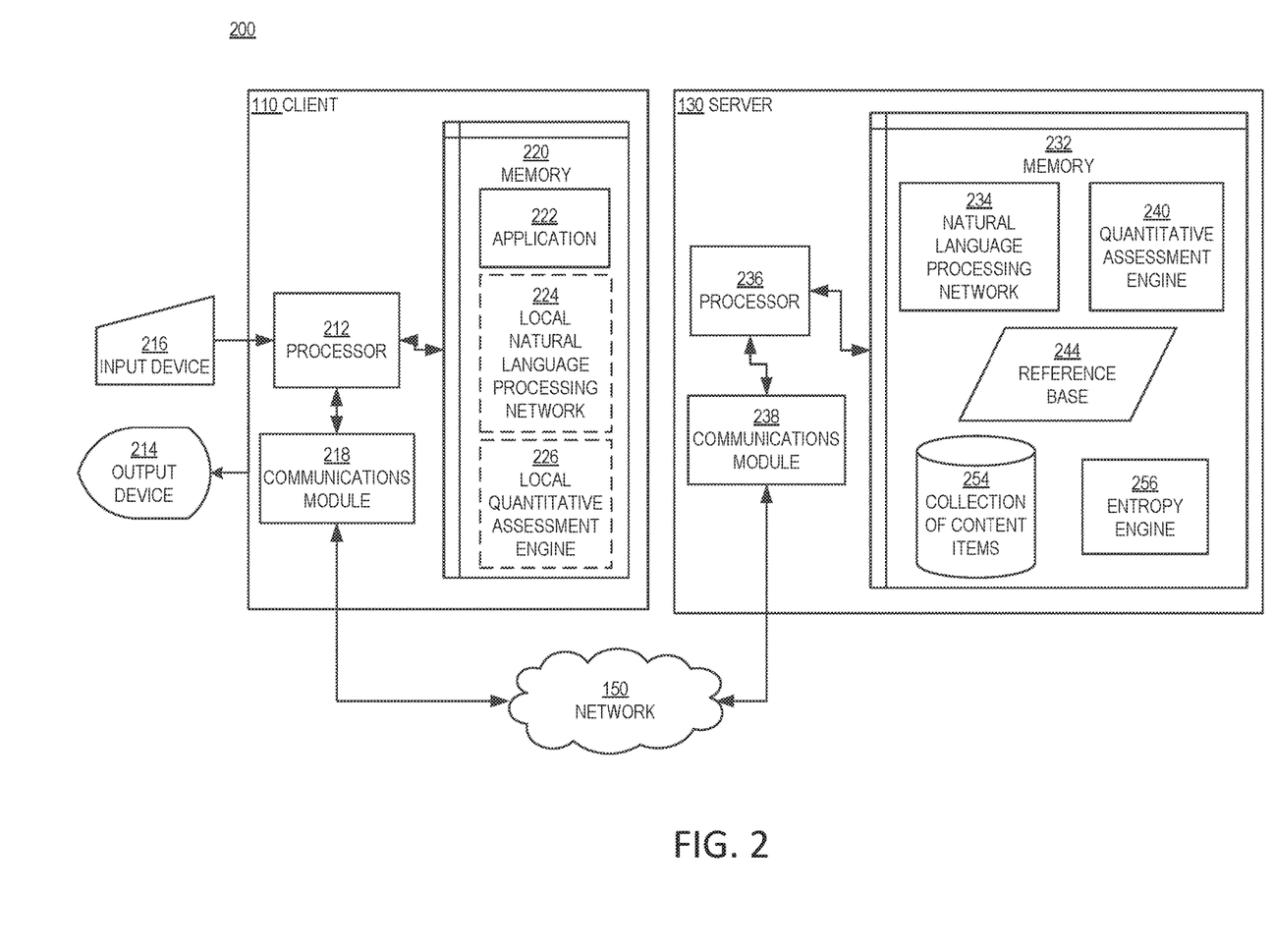
FIG. 2 is a block diagram illustrating an example client and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a processor 236, a communications module 238, and a memory 232. The memory 232 of the server 130 includes a natural language processing network 234. The memory 232 also includes a quantitative assessment engine 240. Also included in the memory 232 of the server 130 is an entropy engine 256. The memory 232 also includes a collection of content items 254. The collection of content items 254 can be, for example, a corpus of documents or books that contain different bodies of text with different levels of text complexity.

Also included in the memory 232 of the server 130 is a set of reference bases 244. The set of reference bases 244 can be, for example, a collection of data structures, where each data structure serves as a baseline for determining the text complexity in sample text (or text in question). Each of the baseline data structures (or reference bases 244) can be established from a corpus of documents or books in a wide range of natural languages (e.g., English, Spanish, French, German, etc.). For example, "The Project Guttenberg" text can be used for English; similar corpora may exist for other languages. In some aspects, all references bases 244 are unified, and each identified word of a reference base is tagged with its corresponding source language.

Although the set of reference bases 244 is illustrated as being separate from the collection of content items 254, in certain aspects the set of reference bases 244 is a subset of the collection of content items 254. Furthermore, although the collection of content items 254 and the set of reference bases 244 are illustrated as being in the same memory 232 of a server 130 as the natural language processing network 234, in certain aspects the collection of content items 254 and the set of reference bases 244 can be hosted in a memory of a different server but accessible by the server 130 illustrated in FIG. 2.

In one or more implementations, the processor 212, using the local natural language processing network 224, tokenizes each document within a reference base by punctuation and spaces to split each block of text into predetermined sequence sizes such as n-grams, where n is a positive integer value.

In one or more implementations, tokenizing involves splitting the given text into discrete parts. In a book, this may involve breaking the given text into words by looking at each space and considering the data between spaces to be a single word. Punctuation, markup languages (e.g., XML, HTML), and illegible characters may be stripped out from the source material to ensure the given text can be parsed properly (i.e.: "My "sentence" contains, extra, punctuation!, said Joe" would be normalized and tokenized into: "my sentence contains extra punctuation said joe".)

By splitting each block of text into n-grams, the subject system iterates through an increasing size of n-gram, meaning, a natural language processor (e.g., the local natural language processing network 224, the natural language processing network 234) first splits a block of text into single words, then into word pairs, then into word triplets, etc. Based on the relative uniqueness of text and the arbitrary number of ways of placing words together, relationships between words may become effectively meaningless above 5-6 n-grams. In the subject technology, the relationship of concepts between sentences is not as necessary, as an overall view into complexity is the primary goal, not a deeper understanding of the text itself.

In natural language processing, an "n-gram" is a set of items, which occur sequentially. For example, the natural language processing network 234 may focus on words where a unigram is a single word, bigram is two adjacent words, trigram is three words, etc. where "n" can be any number of words. It could potentially be extended to handle syllables or other subsets of words, at which point a word such as "Chicago" would be a tri-gram: "Chi"-"ca"-"go". Any size of n-gram can be used but common implementations may tend to use uni, bi, and trigrams most effectively due to the relatively inconsistently repetitive nature of long phrases.

In one or more implementations, the processor 212, using the local quantitative assessment engine 226, stores a bitmask indicating the applicable source languages given that many words exist in different languages. In one or more implementations, a bitmask is a set of binary bits that represents which languages are applicable for a given word. Each bit is assigned to a particular language, and a string of bits represents the complete view into which languages a particular word appears. As an example, the word "angst" is a word in German as well as English but doesn't appear in Spanish. The following would represent "angst" in bitmask form:

101, where bit one (leftmost) is English, bit two (middle) is Spanish, and bit three (right) is German. The word "no" which is present in English and Spanish but not German would be represented as:

110, where this form of bit masking allows for efficient storage, lookup, and identification of the source language by having an entire superset of a dictionary available when inspecting word content.

In one or more implementations, the processor 212, using the local quantitative assessment engine 226, scores each n-gram based on the number of occurrences in the reference base relative to the average number of occurrences of all n-grams.

In one or more implementations, as n-grams are found from the reference base, the identified n-grams are inserted into a linked list. The linked list is iterated each time a new n-gram is identified to update the bitmask. After the reference base is built, the linked list is iterated to build a hash map for efficient lookup. This constitutes calculating a checksum (CRC64, MD5, or similar) of the n-gram held within the linked list and storing the checksum in a separate table. The hash map may be sorted using a binary sort algorithm. Then, when wanting to search for a particular n-gram, a binary search is performed on the hash of the n-gram, returning the underlying entry within the linked list.

In operation, the same tokenizing operation is applied to the text in question, where the processor 212, using the local natural language processing network 224, breaks the text in question apart into individual words (or discrete parts of text). In one or more implementations, a common "bag of words" parsing is used, which increments a counter on each identified word.

The processor 212, using the local natural language processing network 224 and/or the local quantitative assessment engine 226, then matches the text to a particular language by seeing which reference base contains the highest number of matching words within the text. For better efficiency, the text may be reduced into a representative subset of words (or sub-blocks of text).

The processor 212, using the local natural language processing network 224 and/or the local quantitative assessment engine 226, then identifies a number of words within the text (if adequately long) that exceed a predetermined threshold (e.g., the top 1000 words), which may roughly match the overall frequency occurrence in a common language. In some implementations, the reference bases are also reduced into the top 1000 words from each language. In this respect, the top 1000 words from the text are searched and tallied across each reference base subsets.

When matching the language of the text, each word is tokenized from the text and stored in a hash map. In one or more implementations, words are stemmed (e.g., removing the endings or pluralization of words) to ensure matches are accurate and independent of specific use context. In some aspects, the stemmed words (i.e. -ing, -ed, -s, removed) help prevent endings from obscuring word counts.

Each time each word is encountered, the count of occurrences of each word is incremented. Then, after the text has been fully processed, the resultant list of words is sorted by the number of occurrences in the text. In some aspects, the top 1000 words within the text are retained and the remainder are removed from the list.

To identify the source language of the supplied text, each of the top 1000 words are looked up against the reference base to check their bitmasks. The bitmask indicates which languages the words appear in (e.g., 110, 101, 011). In one or more implementations, a sum over the bitmasks for each word indicates the language most accurately representing the text when a particular language is more than one standard deviation over the mean of other languages. In some aspects, a particular language may be 90%+ more represented than any other language.

The processor 212, using the local natural language processing network 224 and/or the local quantitative assessment engine 226, selects the reference base with the highest number of matching words as the reference base to use. Consequently, the selected reference base is identified as the language of the supplied text.

The processor 212, using the local natural language processing network 224 and/or the local quantitative assessment engine 226, iterates through the text based on the tokenizing operation. As words (or discrete parts) are iterated, a structure holding a rolling count of the traditional readability scores (e.g., FLESCH-KINCAID, ARI, and SMOG) is updated to allow each of these scores to be saved in addition to the new score.

Each time a new word is encountered, the processor 212, using the entropy engine 256, calculates an entropy value of the word, and the resultant entropy value is multiplied by the number of syllables in the word. The number of syllables is calculated in a naïve manner, which may be consistent and effective by simply counting the number of vowels in a word. In one or more implementations, the results are normalized across a body of text.

In one or more implementations, as text is iterated, the entropy is calculated using the standard Shannon entropy function over text:

$$H(X) = \sum_{i=1}^{n} P(x_i)I(x_i) = -\sum_{i=1}^{n} P(x_i)\log_b P(x_i),\quad \text{Equation (1)}$$

In some implementations, the entropy of each word is saved into an array. The reference base is queried for each n-gram and the returned frequency is saved in the array. In some aspects, n-grams that are not present in the reference base may be ignored (e.g., n-grams that represent data that is not present in the overall collected corpus and, therefore, may be character names in a book or other data that does not increase complexity due to it having no common meaning outside of the text).

After the text has been parsed, the array is summed and averaged. The array may then be iterated again, and words with a score above the average are retained. In this respect, the processor 212, using the local quantitative assessment engine 226, retains words with an above-average score.

The end text complexity score may be the sum of all of the scores of the remaining words divided by the number of remaining words. In one or more implementations, the final text complexity score is the sum of the scores of all unique words in the text divided by the number of unique words, giving the average complexity per word.

A scaling coefficient may then be applied to map the final text complexity result onto conventional grade levels. In one or more implementations, the scaling coefficient is applied to the results to align them to existing metrics, and provide a result similar to grade/age level as in the other, traditional approaches. This scaling coefficient can be configured in a culturally-specific context depending on the age ranges associated with particular years in school.

In some aspects, a general scaling factor (or coefficient) can be applied to the scores to have it match up with education grade levels. This is generally accomplished by: (1) taking a number of texts assigned in known grade levels (i.e. a Fourth Grade reading list), (2) generating scores for each of these texts, (3) finding the average score for each text, and/or (4) applying the appropriate scaling factor which results in (average score/factor=target grade level).

Rather than processing lists through one or more read operations, existing scores (e.g., SMOG, ARI) can be used to derive this scaling factor, which may result in the output from the subject technology correlating with their results for particular texts. However, this does not result in all output always correlating with the older scoring approaches. In some aspects, the scaling factor ensures that the scores match where they are known to be required to match but allows them to deviate for future texts. There may be circumstances where the subject technology may return similar results to existing approaches but for the use-cases where the subject technology may be necessary (e.g., accommodating for limitations in existing scores), it may continue to return different results, even with the scaling factor being applied.

Architecturally, the client (e.g., the client device 110) may supply text in an unstructured and raw form through an application programming interface (API), wrapped in JavaScript Object Notation (JSON), Extensible Markup Language (XML), or another transmission structure. The service can reside on the end user's computing device (e.g., the client device 110), within a word processor/browser/reader process (e.g., the application 222), or on an external server (e.g., the server 130), depending on requirements and computational resource availability.

In one or more implementations, the readability score output to the application 222 running on the client device 110 is a set of floating point scores, which indicate the complexity of the text. The set of floating point scores can be applied more granularly so that the client device 110 can render which paragraphs contribute most to the overall complexity. Deeper than that, the client device 110 can drill down to which words in the higher complexity paragraphs contribute the most to allow the end user to quickly identify where changes are most appropriate. This can be integrated with a thesaurus or other external dictionary source to give users suggestions or other visual cues for changes to perform.

Figure 3:
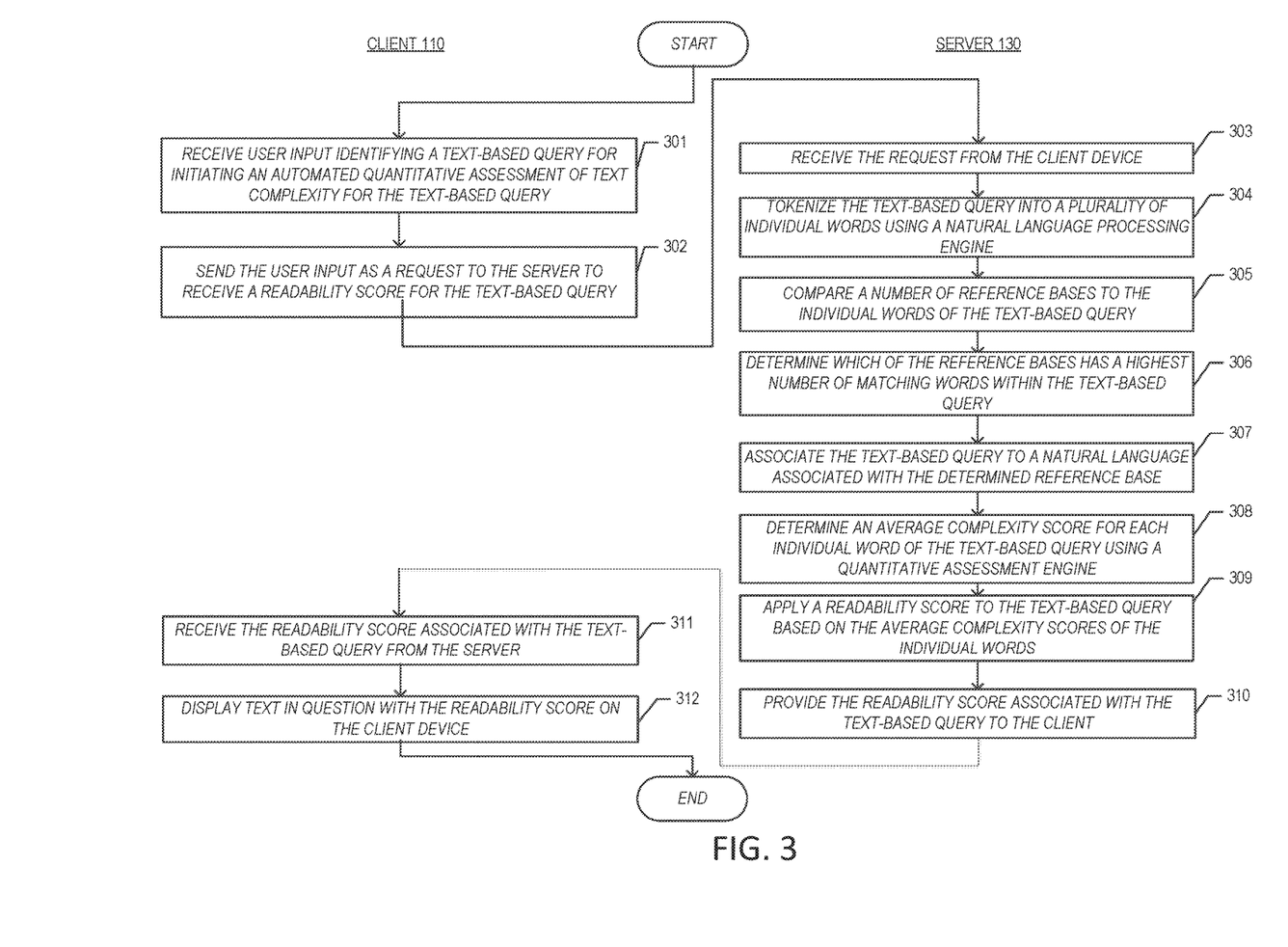
FIG. 3 illustrates an example process for automated quantitative assessment of text complexity using the example client and server of FIG. 2.

FIG. 3 illustrates an example process 300 for an automated quantitative assessment of text complexity using the example client and server of FIG. 2. The process 300 begins in step 301 when a user, for example, loads an application 222 on a client 110 and the client 110 receives an input from the user using the input device 216, where the input indicates a text-based query for initiating an automated quantitative assessment of text complexity for the text-based query based on matching words from a reference base in a collection of content items 254. The input indicates a body of text that may include one or more individual words (or terms) in a given natural language. In this respect, the natural language processing network 234 and the quantitative assessment engine 240 may identify a readability score for the body of text in a determined natural language (e.g., English, French, German, Spanish, etc.).

Next, in step 302, the application 222 on the client 110 sends the user input as a request to the server 130 in order to receive a readability score for the text-based query. Turning to the server 130, in step 303, the server 130 receives the request from the client 110.

Subsequently, in step 304, the server 130 tokenizes the text-based query into a plurality of individual words using the natural language processing network 234. In this step, the tokenizing involves splitting the body of text in the text-based query into discrete parts such as by parsing the text-based query into individual words. In step 305, the processor 236 of the server 130 compares a number of reference bases to the individual words of the text-based query. In some aspects, the content items represent different reference bases that contain a subset of the overall number of words in the collection of content items 254 from each natural language, thereby alleviating the assessment burden by reducing the volume of parsed words to compare against. Next, in step 306, the processor 236 determines which of the reference bases has a highest number of matching words within the text-based query. Subsequently, in step 307, the processor 236, associates the body of text in the text-based query to a natural language associated with the determined reference base. In step 308, the processor 236, using the quantitative assessment engine 240, determines an average complexity score for each individual word of the text-based query. Next, in step 309, the processor 236, using the quantitative assessment engine 240, applies the readability score to the text-based query based on the average complexity scores of the individual words. Subsequently, in step 310, the processor 236 provides the readability score associated with the text-based query to the client.

Turning to the client 110, in step 311, the client 110 receives the readability score associated with the text-based query from the server 130. The readability score may be represented as a set of floating point scores that indicate the complexity of the body of text in the text-based query. In step 312, the client 110 displays the text in question with the readability score on the client 110. In some aspects, the readability score is applied more granularly so that the client 110 can render which paragraphs contribute most to the overall complexity. In some aspects, the readability score can be integrated with (or communicably coupled to) a thesaurus to provide user suggestions or other visual cues for changes to perform.

Figure 4:
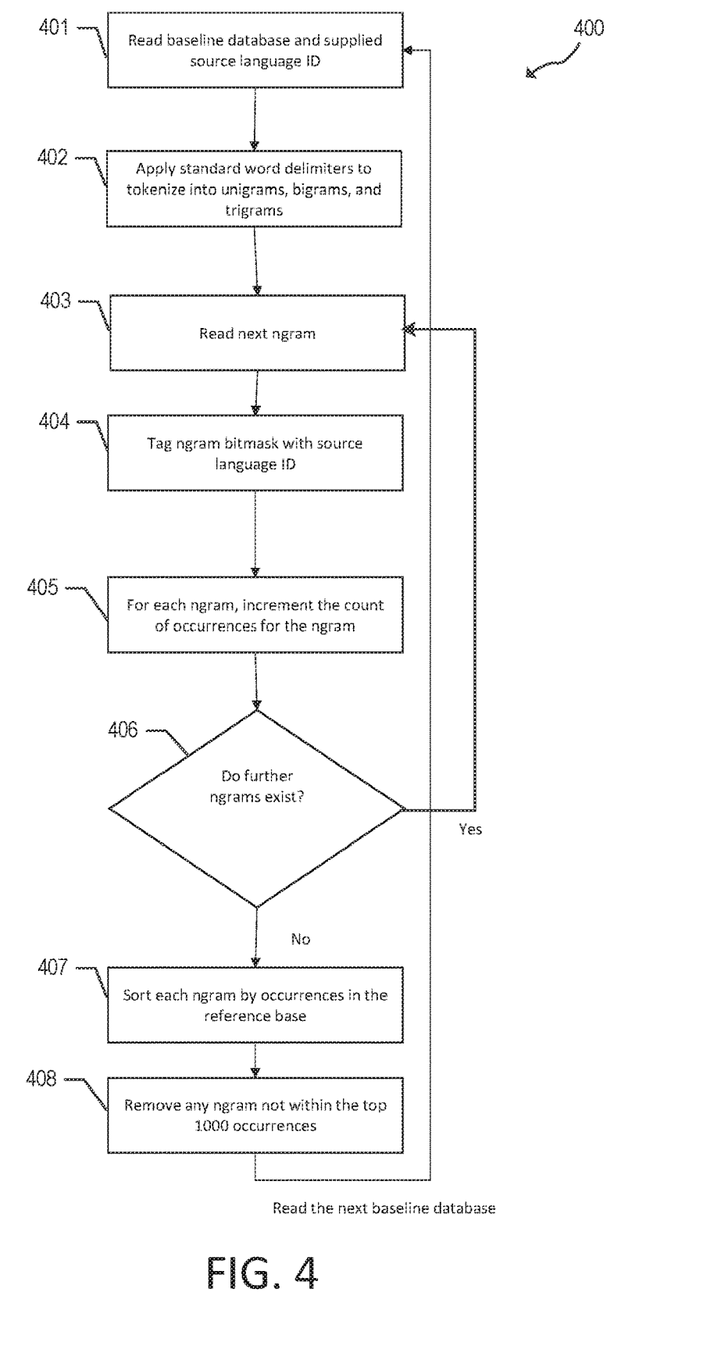
FIG. 4 illustrates an example process for automated quantitative assessment of text complexity.

FIG. 4 illustrates an example process 400 for practicing implementations of automated quantitative assessment of text complexity using the example client 110 of FIG. 2. For explanatory purposes, the example process 400 is described herein with reference to the processor 212 of FIG. 2; however, the example process 400 is not limited to the processor 212 of FIG. 2, and one or more blocks of the example process 400 may be performed by one or more other components of the client 110, such as the local natural language processing network 224 and/or the local quantitative assessment engine 226, as well as one or more other components of the server 130, such as the processor 236, the natural language processing network 234 and/or the quantitative assessment engine 240. Further for explanatory purposes, the blocks of the example process 400 are described herein as occurring in serial, or linearly. However, multiple blocks of the example process 400 may occur in parallel. In addition, the blocks of the example process 400 need not be performed in the order shown and/or one or more of the blocks of the example process 400 need not be performed.

Referring to FIG. 4, in step 401, a baseline data structure (e.g., database) is read and supplied with a source language identifier. In this respect, the source language identifier is applied to the baseline data structure to denote that one or more content items (e.g., documents) correspond to a natural language identified by the source language identifier. The content items discussed in reference to FIG. 4 are items that belong to (or associated with) the baseline data structure.

At step 402, standard word delimiters are applied to tokenize each of the content items in the baseline data structure into discrete parts of predetermined sequence sizes (e.g., unigrams, bigrams, trigrams, etc.).

Next, at step 403, the next discrete part of the content item is read and processed. At step 404, the bitmask associated with the next discrete part is tagged with a source language identifier.

Subsequently, at step 405, for each discrete part of the content item, a counter indicating a number of occurrences that a discrete part of the content item has been processed is incremented by one. At step 406, a determination is made on whether any further discrete parts of the content item remain to be processed. If no further discrete parts remain, then the process 400 proceeds to step 407. Otherwise, the process 400 proceeds back to step 403 to process a next discrete part of the content item.

At step 407, each of the processed discrete parts of the content item is sorted by the number of occurrences of the discrete part in the baseline data structure. Subsequently, at step 408, any discrete parts of the text are removed from the baseline data structure that is not exceeding a predetermined number of occurrences. For example, any n-gram not within the top 1000 occurrences is removed. The process 400 then proceeds back to step 401 to read the next baseline data structure.

Figure 5:
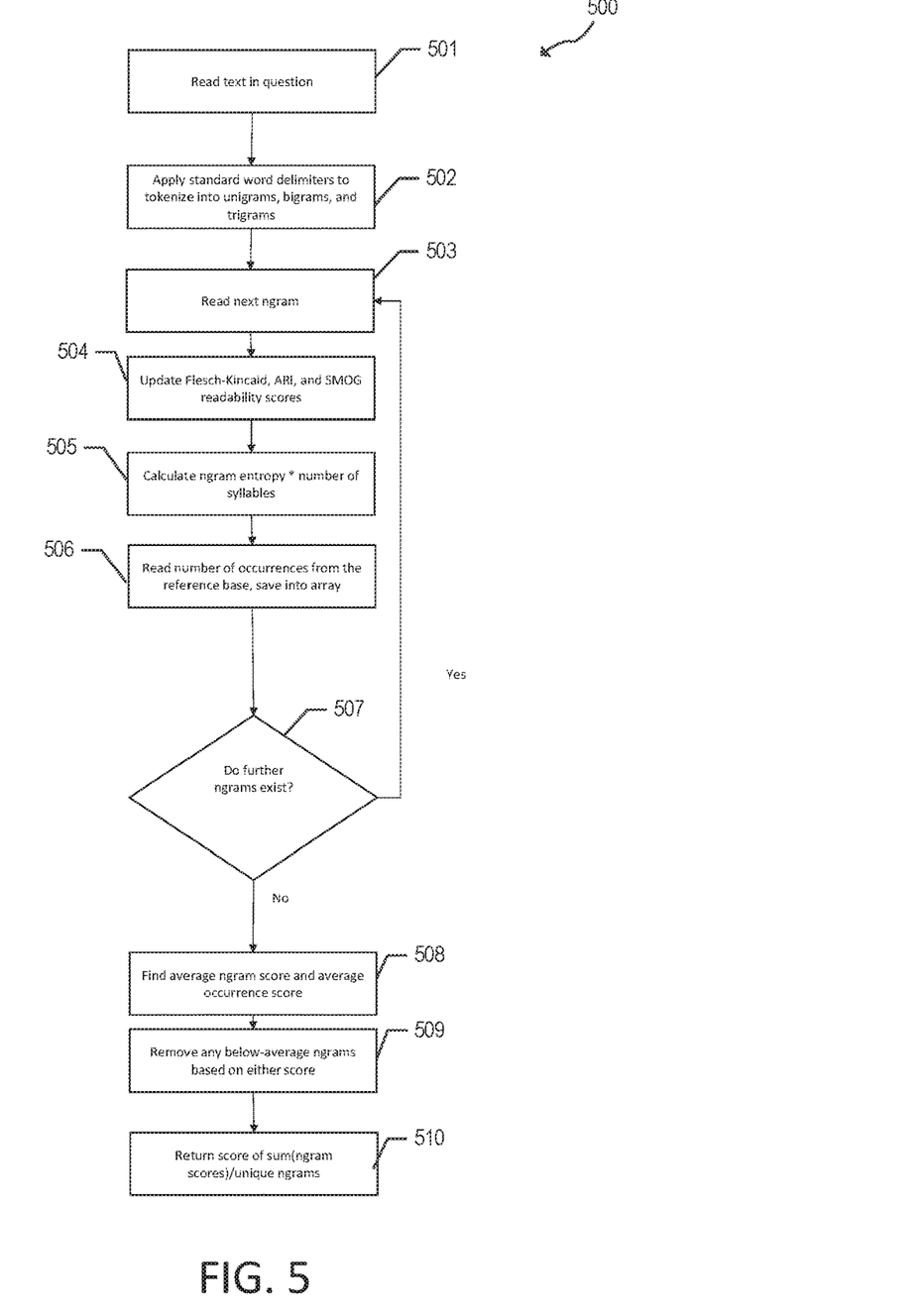
FIG. 5 illustrates another example process for automated quantitative assessment of text complexity.

FIG. 5 illustrates an example process 500 for practicing implementations of automated quantitative assessment of text complexity using the example client 110 of FIG. 2. For explanatory purposes, the example process 500 is described herein with reference to the processor 212 of FIG. 2; however, the example process 500 is not limited to the processor 212 of FIG. 2, and one or more blocks of the example process 500 may be performed by one or more other components of the client 110, such as the local natural language processing network 224 and/or the local quantitative assessment engine 226, as well as one or more other components of the server 130, such as the processor 236, the natural language processing network 234 and/or the quantitative assessment engine 240. Further for explanatory purposes, the blocks of the example process 500 are described herein as occurring in serial, or linearly. However, multiple blocks of the example process 500 may occur in parallel. In addition, the blocks of the example process 500 need not be performed in the order shown and/or one or more of the blocks of the example process 500 need not be performed.

Referring to FIG. 5, in step 501, a body of text in question from a content item such as a document is accessed and read by one or more processors (e.g., the local natural language processing network 224, the natural language processing network 234).

At step 502, standard word delimiters are applied to tokenize each of the content items in the baseline data structure into discrete parts of text with predetermined sequence sizes (e.g., unigrams, bigrams, trigrams, etc.).

Next, at step 503, the next discrete part of the content item is read and processed. Subsequently, at step 504, traditional readability scores (e.g., FLESCH-KINCAID, ARI, SMOG) are updated. At step 505, an entropy value for the next discrete part is calculated, and then multiplied with the number of syllables contained in the next discrete part of the content item.

Subsequently, at step 506, a number of occurrences for the next discrete part of the content item is read from the baseline data structure, and thereafter saved into an array. Next, at step 507, a determination is made on whether any further discrete parts of the content item remain to be processed. If no further discrete parts remain, then the process 500 proceeds to step 508. Otherwise, the process 500 proceeds back to step 503 to process a next discrete part of the content item.

Next, at step 508, the average complexity score and average occurrence score for the discrete part of the text are determined. Subsequently, at step 509, any discrete parts of the text are removed from consideration for calculating the overall complexity score that are not exceeding a predetermined score for either the average occurrence score or the average complexity score. For example, any n-gram that has a below-average complexity score or below-average occurrence score is removed. At step 510, a readability score for the body of text is returned. The readability score is calculated based on the sum of the scores of all the unique discrete parts of text divided by the number of unique discrete parts, giving the average complexity per discrete part of text. The process 400 then proceeds back to step 401 to read the next baseline data structure.

Figure 6:
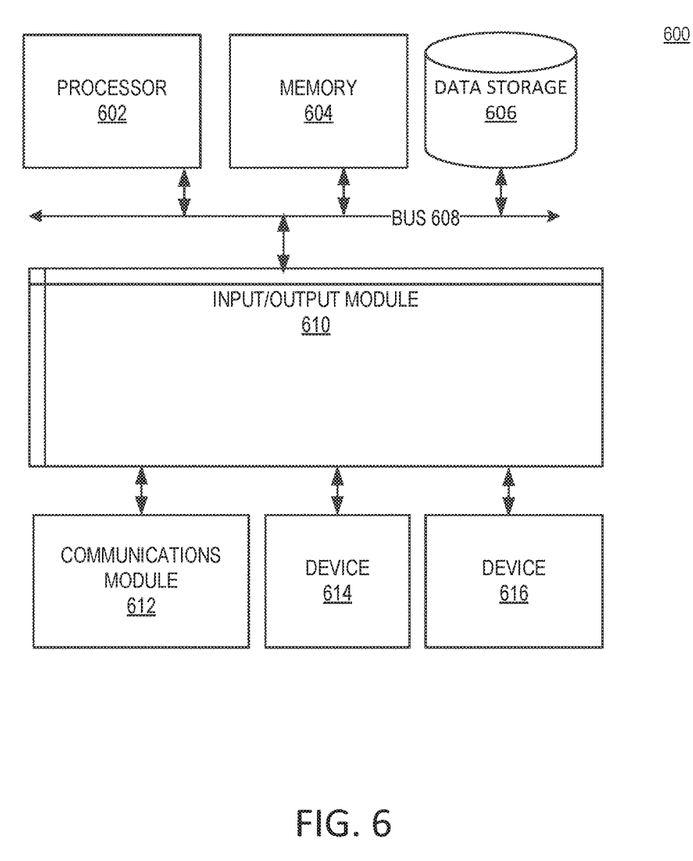
FIG. 6 is a block diagram illustrating an example computer system with which the client and server of FIG. 2 can be implemented.

FIG. 6 is a block diagram illustrating an exemplary computer system 600 with which the client 110 and server 130 of FIG. 1 can be implemented. In certain aspects, the computer system 600 may be implemented using hardware or a combination of software and hardware, either in a dedicated server, or integrated into another entity, or distributed across multiple entities.

Computer system 600 (e.g., client 110 and server 130) includes a bus 608 or other communication mechanism for communicating information, and a processor 602 (e.g., processor 212 and 236) coupled with bus 608 for processing information. By way of example, the computer system 600 may be implemented with one or more processors 602. Processor 602 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 600 can include, in addition to hardware, code that creates an execution environment for the computer program in question, e.g., code that constitutes processor firmware, a protocol stack, a database management system, an operating system, or a combination of one or more of them stored in an included memory 604 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. The processor 602 and the memory 604 can be supplemented by, or incorporated in, special purpose logic circuitry.

The instructions may be stored in the memory 604 and implemented in one or more computer program products, i.e., one or more modules of computer program instructions encoded on a computer readable medium for execution by, or to control the operation of, the computer system 600, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 604 may also be used for storing temporary variable or other intermediate information during execution of instructions to be executed by processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 600 further includes a data storage device 606 such as a magnetic disk or optical disk, coupled to bus 608 for storing information and instructions. Computer system 600 may be coupled via input/output module 610 to various devices. The input/output module 610 can be any input/output module. Exemplary input/output modules 610 include data ports such as USB ports. The input/output module 610 is configured to connect to a communications module 612. Exemplary communications modules 612 (e.g., communications modules 218 and 238) include networking interface cards, such as Ethernet cards and modems. In certain aspects, the input/output module 610 is configured to connect to a plurality of devices, such as an input device 614 (e.g., input device 216) and/or an output device 616 (e.g., output device 214). Exemplary input devices 614 include a keyboard and a pointing device, e.g., a mouse or a trackball, by which a user can provide input to the computer system 600. Other kinds of input devices 614 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 616 include display devices, such as a LCD (liquid crystal display) monitor, for displaying information to the user.

According to one aspect of the present disclosure, the client 110 and server 130 can be implemented using a computer system 600 in response to processor 602 executing one or more sequences of one or more instructions contained in memory 604. Such instructions may be read into memory 604 from another machine-readable medium, such as data storage device 606. Execution of the sequences of instructions contained in main memory 604 causes processor 602 to perform the process steps described herein. One or more processors in a multi-processing arrangement may also be employed to execute the sequences of instructions contained in memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 600 can include clients and servers. A client and server are generally remote from each other and typically interact through a communication network. The relationship of client and server arises by virtue of computer programs running on the respective computers and having a client-server relationship to each other. Computer system 600 can be, for example, and without limitation, a desktop computer, laptop computer, or tablet computer. Computer system 600 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 602 for execution. Such a medium may take many forms, including, but not limited to, non-volatile media, volatile media, and transmission media. Non-volatile media include, for example, optical or magnetic disks, such as data storage device 606. Volatile media include dynamic memory, such as memory 604. Transmission media include coaxial cables, copper wire, and fiber optics, including the wires that comprise bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the images in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
    processing at least one body of text in a text-based query using a natural language processing engine, the processed at least one body of text comprising one or more sub-blocks of text in one or more predetermined sequence sizes;

comparing a plurality of reference bases to the processed at least one body of text, each of the plurality of reference bases being associated with a different one of a plurality of natural languages;

determining which of the plurality of reference bases has a highest number of matching words within the body of text of the text-based query;

associating the text-based query to a natural language associated with the determined reference base from the plurality of natural languages;

determining an average complexity score for each of the one or more sub-blocks of text using a quantitative assessment engine;

applying a readability score to the at least one body of text based on the average complexity scores of the one or more sub-blocks of text;

providing the readability score to an application of a client device, the readability score comprising a set of floating point scores indicating a level of complexity for the at least one body of text; and wherein the average complexity score, natural language association, and readability score are developed during a single pass through the plurality of reference bases by the comparing step, determining an entropy value for at least one of the one or more sub-blocks of text before the single pass through the plurality of reference bases; and multiplying the entropy value with a number of syllables in the at least one of the one or more sub-blocks of text for use in developing the average complexity score.

2. The computer-implemented method of claim 1, wherein the processing of the at least one body of text comprises:
tokenizing the at least one body of text into the one or more sub-blocks of text with a corresponding predetermined sequence size.

3. The computer-implemented method of claim 2, wherein the tokenizing comprises:
applying word delimiters to the at least one body of text;
determining a number of items occurring sequentially in the least one body of text using the applied word delimiters; and
parsing the at least one body of text into the one or more sub-blocks of text based on the determined number of items occurring sequentially in the at least one body of text, each of the one or more sub-blocks of text corresponding to one of a plurality of predetermined sequence sizes.

4. The computer-implemented method of claim 3, wherein the plurality of predetermined sequence sizes comprises a unigram representing a one-word sequence, a bigram representing a two-word sequence, and a trigram representing a three-word sequence.

5. The computer-implemented method of claim 2, wherein the tokenizing comprises:
removing one or more of punctuation symbols, markup language characters or illegible characters from the at least one body of text.

6. The computer-implemented method of claim 1, further comprising:
determining a bitmask for each of the one or more sub-blocks of text indicating a binary representation of a subset of the plurality of natural languages that include the words of each of the one or more sub-blocks of text.

7. The computer-implemented method of claim 6, further comprising:
tagging a bitmask associated with the at least one of one or more sub-blocks of text with a source language identifier.

8. The computer-implemented method of claim 1, wherein the readability score is a sum of all average complexity scores for the at least one body of text divided by a number of sub-blocks of text parsed from the at least one body of text.

9. The computer-implemented method of claim 1, further comprising:
applying a scaling coefficient to the readability score to correlate the readability score to a target grade level.

10. A system comprising:
one or more processors;
a non-transitory computer-readable storage medium coupled to the one or more processors, the non-transitory computer-readable storage medium including instructions that, when executed by the one or more processors, cause the one or more processors to:
process a baseline data structure and a given source language identifier;
apply one or more standard word delimiters to a body of text to tokenize the body of text into one or more discrete portions of text with predetermined sequence sizes;
process at least one of the one or more discrete portions of text;
develop one or more bitmasks for each of the one or more discrete portions of text indicating a binary representation of a subset of the plurality of natural languages that include a word of each of the one or more discrete portions of text;
determine an entropy value for the one or more discrete portions of text wherein the entropy value is determined before assigning a source language identifier, wherein the entropy value is an input to a complexity score;
tag each of the one or more bitmasks associated with each of the at least one of the one or more discrete portions of text with the source language identifier;
for each of the one or more discrete portions of text, modifying a count of occurrences for the discrete portion of text using the processed baseline data structure;
determine whether additional discrete portions of text exist in the body of text;
sort each of the discrete portions of text by occurrences in the baseline data structure using the modified count of occurrences when the additional discrete portions of text were determined not to exist in the body of text;
process at least one of the additional discrete portions of text when the additional discrete portions of text were determined to exist in the body of text; and
remove at least one of the sorted discrete portions of text having a count of occurrences that does not exceed a predetermined threshold, the at least one of the sorted discrete portions of text being removed from the baseline data structure.

11. The system of claim 10, wherein at least one of the one or more discrete portions of text are stemmed by removing a portion of text representing an ending for the at least one of the one or more discrete portions of text.

12. The system of claim 10, wherein the baseline data structure with a highest number of matching words is selected as a reference base for processing a supplied text and identified as a source language of the supplied text, the matching words comprising the at least one of the one or more discrete portions of text.

13. A non-transitory computer-readable storage medium coupled to one or more processors, the non-transitory computer-readable storage medium including instructions that, when executed by the one or more processors, cause the one or more processors to:
process a body of text in question via an application on a client device;
apply word delimiters to tokenize the body of text in question into a plurality of discrete portions of text with respective sequence sizes;
process one of the discrete portions of text;
update a readability score for the discrete portion of text;
determine an entropy value for the discrete portion of text wherein the entropy value is language-independent and based on the discrete portion of text without comparison to a reference base;
modify the determined entropy value with a value indicating a number of syllables in the discrete portion of text;
determine an average complexity score for the discrete portion of text using the modified entropy value;
determine an average occurrence score for the discrete portion of text based on a number of occurrences of the discrete portion of text in a reference base;
determine a complexity score for the body of text based on a sum of the average complexity score and the average occurrence score of each of the discrete portions of text; and
provide the complexity score to the application on the client device.

14. The non-transitory computer-readable storage medium of claim 13, wherein the instructions cause the one or more processors to:
determine a number of items occurring sequentially in the body of text using the applied word delimiters; and
parse the body of text into the discrete portions of text based on the determined number of items occurring sequentially in the body of text, each of the discrete portions of text corresponding to one of a plurality of predetermined sequence sizes.

15. The non-transitory computer-readable storage medium of claim 13, wherein the instructions cause the one or more processors to:
remove one or more of punctuation symbols, markup language characters or illegible characters from the body of text prior to applying the word delimiters to the body of text.

16. The non-transitory computer-readable storage medium of claim 13, wherein the instructions cause the one or more processors to:
determine a bitmask indicating a binary representation of which of a plurality of natural languages apply to at least one of the discrete portions of text.

17. The non-transitory computer-readable storage medium of claim 13, wherein the instructions cause the one or more processors to:
tag a bitmask associated with the at least one of the discrete portions of text with a source language identifier.

18. The non-transitory computer-readable storage medium of claim 13, wherein the modifying of the determined entropy value comprises multiplying the determined entropy value with the value indicating a number of syllables in the discrete portion of text.

19. The non-transitory computer-readable storage medium of claim 13, wherein the instructions cause the one or more processors to:
apply a scaling coefficient to the complexity score to correlate the complexity score to a target grade level.

* * * * *